US005917717A

United States Patent [19]

Arts et al.

[11] Patent Number: 5,917,717

[45] Date of Patent: Jun. 29, 1999

[54] BALLAST DIMMER WITH PASSIVE POWER FEEDBACK CONTROL

[75] Inventors: Paulus P. B. Arts; Everaard M. J. Aendekerk; Machiel A. M. Hendrix, all of Eindhoven, Netherlands; Pawel M. Gradzki, Milford, Conn.; Jerzy Janczak, Woodhaven, N.Y.

[73] Assignee: U.S. Philips Corporation, New York, N.Y.

[21] Appl. No.: 08/903,567

[22] Filed: Jul. 31, 1997

[51] Int. Cl.[6] .............................. H02J 3/00; H02M 5/45; G05F 1/00

[52] U.S. Cl. ................................ 363/34; 363/37; 363/39; 315/291; 315/307

[58] Field of Search ................................ 363/34, 37, 17, 363/67, 68, 98; 315/247, 219, 308, 287

[56] References Cited

U.S. PATENT DOCUMENTS

| | | | |
|---|---|---|---|
| 5,134,556 | 7/1992 | De Mere | 363/37 |
| 5,404,082 | 4/1995 | Hernandez et al. | 315/219 |
| 5,525,872 | 6/1996 | Achten et al. | 315/291 |
| 5,757,143 | 5/1998 | Martucci et al. | 315/247 |

FOREIGN PATENT DOCUMENTS

| | | | |
|---|---|---|---|
| WO9610897 | 4/1996 | WIPO | H05B 41/02 |

*Primary Examiner*—Peter S. Wong
*Assistant Examiner*—Rajnikant B. Patel
*Attorney, Agent, or Firm*—Bernard Franzblau

[57] ABSTRACT

A circuit arrangement for the high-frequency operation of a discharge lamp comprises a first rectifying circuit (D1–D4) for generating a DC voltage across a first capacitor (C1) from a low-frequency supply voltage. A DC/AC converter (IV) for generating a high-frequency AC voltage at a frequency f from the DC voltage is coupled to a load branch (B) provided with coupling means (T3, T4) for coupling the discharge lamp (Li) to the load branch. The load branch connects a junction point N1 of the DC/AC converter to a junction point N2 between the first rectifying circuit and the first capacitor. A second rectifying circuit for converting a high-frequency voltage generated by the DC/AC converter into a DC voltage is coupled to the first capacitor and to a junction point N3 in the load branch. A control circuit controls the power consumed by the discharge lamp through variation of the frequency f. The coupling means are connected between the junction point N2 and the junction point N3 in the load branch.

15 Claims, 6 Drawing Sheets

BALLAST DIMMER WITH PASSIVE POWER FEEDBACK CONTROL

BACKGROUND OF THE INVENTION

The invention relates to a circuit arrangement for high-frequency operation of a discharge lamp, comprising input terminals for connection to a low-frequency supply voltage source, first rectifying means for generating a DC voltage across first capacitive means from a low-frequency supply voltage delivered by the low-frequency supply voltage source, a DC/AC converter for generating a high-frequency AC voltage with a frequency f from the DC voltage, a load branch comprising a series arrangement of inductive means, second capacitive means, and coupling means for coupling the discharge lamp to the load branch, which series arrangement connects a junction point N1 of the DC/AC converter to a junction point N2 between the first rectifying means and the first capacitive means, second rectifying means for converting a high-frequency voltage generated by means of the DC/AC converter into a DC voltage. The second rectifying means are coupled to the first capacitive means and to a junction point N3 in the load branch. Control means control the power consumed by the discharge lamp in dependence on a control signal which is a measure of the desired power.

Such a circuit arrangement is known from WO 96/10897. The first rectifying means in the known circuit arrangement are constructed as a voltage doubler, and the first capacitive means across which the voltage doubler generates a DC voltage comprise a first and a second capacitive impedance. The voltage across the first capacitive means is also referred to as a buffer voltage hereinafter. The load branch also comprises further capacitive means besides the inductive means, the second capacitive means, and the coupling means. A side of the further capacitive means is connected to the junction point N2. A further side of the further capacitive means is connected to the junction point N3. The power consumed by the discharge lamp, also referred to as lamp power hereinafter, can be controlled by control means which influence the frequency of switching elements of the DC/AC converter.

The first rectifying means are provided with first and second unidirectional means which at the same time form a part of second rectifying means. The second rectifying means are to ensure that the circuit arrangement substantially acts as a resistive impedance during lamp operation. In that case the circuit arrangement will cause little interference, and the circuit arrangement will have a high power factor during lamp operation. To achieve this, the buffer voltage must always be higher than a bottom value. If voltage doubling is used, this bottom value is equal to the peak-to-peak voltage of the low-frequency voltage source. The bottom value is equal to the peak-to-zero voltage if no voltage doubling takes place. The buffer voltage rises comparatively strongly in the known circuit arrangement in proportion as the power value is set lower. On the one hand, this requires a dimensioning of the circuit arrangement such that the buffer voltage is higher than the bottom value during nominal operation. On the other hand, components such as the switching elements and the first capacitive means must be designed for high voltages, or the range over which the lamp power is controllable must be limited so as to avoid damage to said components.

SUMMARY OF THE INVENTION

It is an object of the invention to provide a circuit arrangement of the kind described in the opening paragraph in which the variation of the buffer voltage across the first capacitive means remains comparatively small over a comparatively wide range of the power consumed by the discharge lamp, while the buffer voltage is higher than the bottom value in said range.

According to the invention, the circuit arrangement is for this purpose characterized in that the control means change the frequency f when the control signal changes, and in that the coupling means are connected in the load branch between the junction point N2 and the junction point N3.

In the circuit arrangement according to the invention, the voltage at the junction point N3 to which the second rectifying means are coupled is largely independent of the lamp current. This renders it possible, surprisingly, to adjust the lamp power to the desired value through changing of the frequency, and at the same time to have the second rectifying means control the level of the buffer voltage such that the variation in the buffer voltage remains limited in the case of a reduction in lamp power. As a result, comparatively inexpensive components can be used in the circuit arrangement according to the invention, while nevertheless the lamp power can be controlled over a comparatively wide range.

The control means for controlling the power consumed by the discharge lamp can change the frequency directly. For example, the control means modulate the frequency f periodically between a high frequency and a low frequency. The power consumed by the lamp then rises approximately linearly with the relative duration of the intervals of low frequency. The best results are obtained in an embodiment in which the frequency assumes a constant value which is steplessly dependent on the desired power. In an embodiment, the frequency f is indirectly dependent on the control signal. For example, the control means described in U.S. Pat. No. 5,525,872 may be used, changing the time Tt-Td of the switching elements as a function of the control signal in a DC/AC converter provided with a half bridge circuit with a first and a second switching element. Tt therein is the time interval during which the switching element is conducting, and Td the time interval during which a free-wheel diode shunting the switching element is conducting. The frequency f also changes in the case of a change in the time Tt-Td.

Among the possibilities of controlling the lamp power as mentioned above, an embodiment in which the lamp power is directly controlled through the frequency of the DC/AC converter is often preferred on account of its simplicity. Although it is desirable to limit the variation in the buffer voltage when the power consumed by the lamp is varied, it is favorable when the voltage across the first capacitive means rises monotonically from a first voltage Vmin at a nominal power consumed by the lamp to a second voltage Vmax at a lamp power one-fifth of the nominal lamp power, the ratio Vmax/Vmin lying between about 1.2 and 1.7. It was found that such a gradual increase in the buffer voltage with a decreasing power consumed by the lamp facilitates a stable operation of the circuit arrangement with a lamp connected thereto.

The discharge lamp and the circuit arrangement may be indetachably coupled. In that case, the coupling means may be constructed as a fixed electrical connection between the load branch and the lamp. Alternatively, a transformer may be included in the load branch for providing an electrical separation between the load branch and the lamp. In another embodiment, the lamp is detachably coupled to the circuit arrangement. The coupling means may be constructed as contact sockets for cooperation with contact pins of the lamp in that case.

An attractive embodiment is characterized in that the transfer function between the voltage at the junction point N3 and the voltage at the junction point N1 in the absence of the discharge lamp has a negative slope in gain characteristic in the control range of the power consumed by the discharge lamp. The voltage at junction point N3 decreases as the frequency increases. This means that also the contribution of the second rectifying means to the charging of the first capacitive means decreases. As a result, the buffer voltage will vary comparatively little upon a variation in the power consumed by the lamp.

A favorable modification of this embodiment is characterized in that the load branch comprises further inductive means, while the junction point N3 lies between the inductive means and the further inductive means, and the second rectifying means are coupled to the junction point N3 in the load branch via a feedback circuit provided with third capacitive means. A very low interference level is achieved again in this modification because the inductive means, the further inductive means, and third capacitive means form a cascade filter in the feedback circuit.

A further attractive embodiment of the circuit arrangement according to the invention is characterized in that the second rectifying means are provided with unidirectional means which are shunted by a parallel branch. A suitable choice of the impedance of the parallel branch achieves that the high-frequency current from junction point N3 to the second rectifying means flows more strongly through the parallel branch in proportion as the lamp power is lower. The contribution of the second rectifying means to the buffer voltage thus decreases.

An advantageous embodiment is characterized in that the second rectifying means are additionally connected to a junction point N5 in the load branch, while the coupling means are connected between the junction point N3 and the junction point N5 in the load branch. The lamp current has a comparatively low crest factor in this embodiment of the circuit arrangement according to the invention. In addition, the load of the second rectifying means is distributed over several components. As a result, these components may have a comparatively low loading capacity and may thus be inexpensive.

The unidirectional means in the second rectifying means may be separate from the first rectifying means. Alternatively, said undirectional means may at the same time form part of the first rectifying means.

BRIEF DESCRIPTION OF THE DRAWINGS

These and other aspects of the circuit arrangement according to the invention will be explained in more detail with reference to a drawing, in which.

DETAILED DESCRIPTION OF THE PREFERRED EMBODIMENTS

Figure 1:
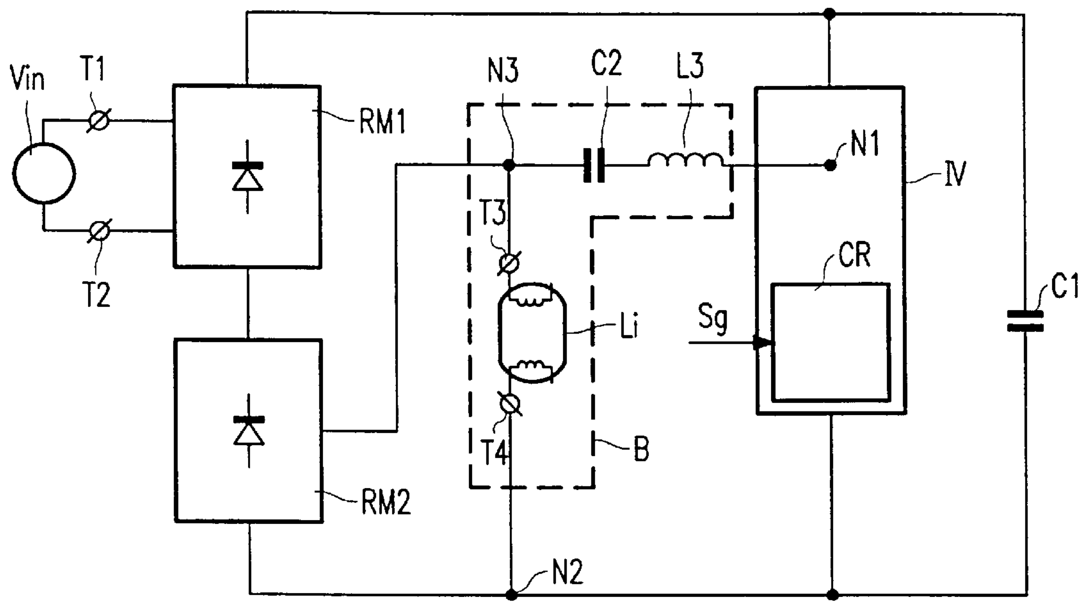
FIG. 1 diagrammatically shows a first embodiment of the circuit arrangement according to the invention.

FIG. 1 diagrammatically shows a first embodiment of a circuit arrangement for high-frequency operation of a discharge lamp Li. The circuit arrangement shown comprises input terminals T1, T2 for connection to a low-frequency voltage source Vin. The circuit arrangement further comprises first rectifying means RM1 for generating a DC voltage across first capacitive means C1 from a low-frequency supply voltage delivered by the low-frequency supply voltage source. The circuit arrangement further comprises a DC/AC converter IV for generating a high-frequency AC voltage with a frequency f from the DC voltage. A load branch B forms part of the circuit arrangement. The load branch comprises a series arrangement of inductive means L3, second capacitive means C2, and coupling means T3, T4 for coupling the discharge lamp Li to the load branch. The series arrangement connects a junction point N1 of the DC/AC converter to a junction point N2 lying between the first rectifying means and the first capacitive means. The circuit arrangement further comprises second rectifying means RM2 for converting a high-frequency voltage generated by means of the DC/AC converter into a DC voltage. The second rectifying means are coupled to the first capacitive means and to a junction point N3 in the load branch. The circuit arrangement is also provided with control means CR for controlling a power consumed by the discharge lamp Li in dependence on a control signal Sg which is a measure of the desired power.

When the control signal Sg changes, the control means CR will change the frequency f. The coupling means T3, T4 are connected between the junction point N2 and the junction point N3 in the load branch.

Figure 2:
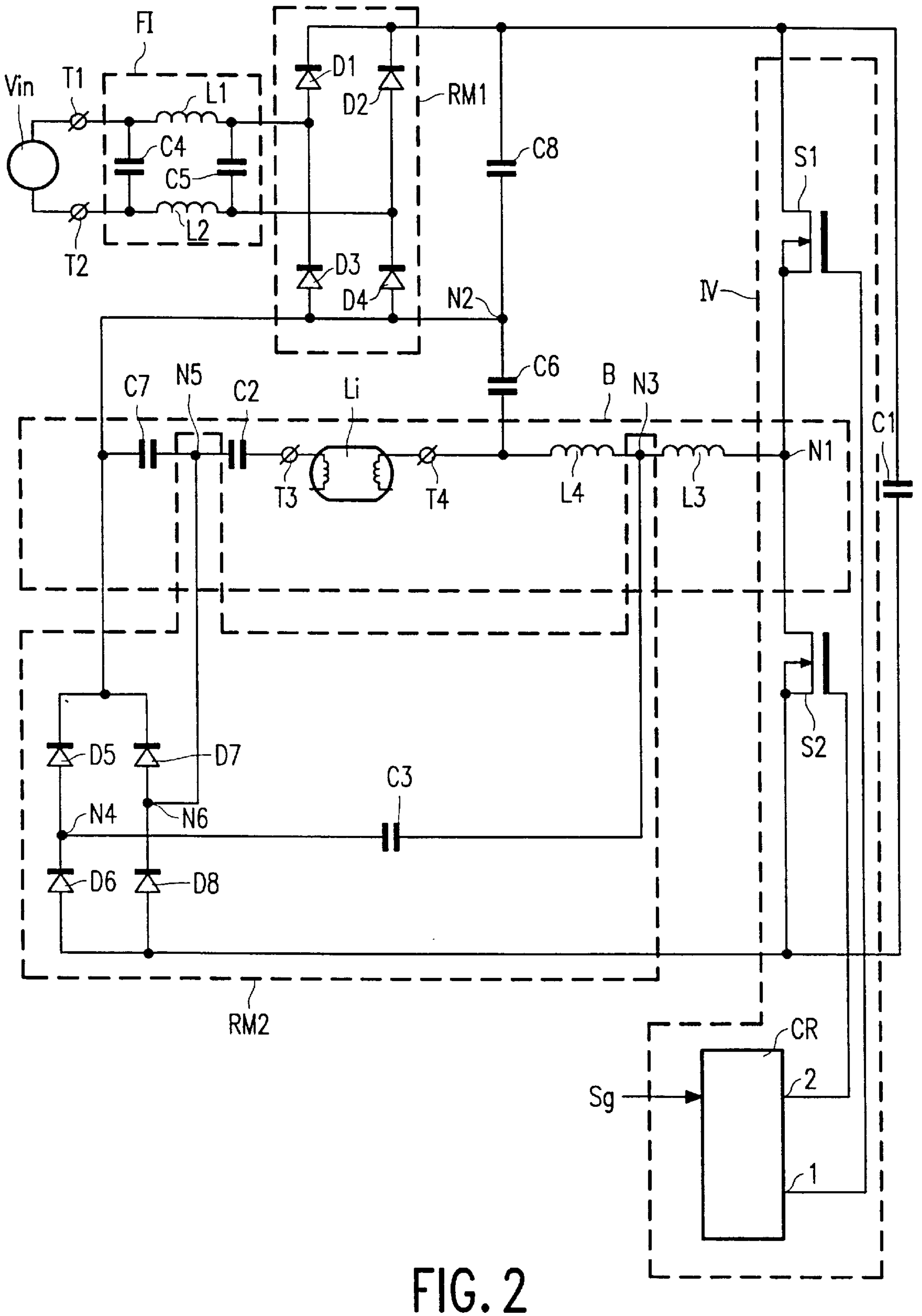
FIG. 2 shows the circuit arrangement of FIG. 1 in greater detail, FIG. 3 plots the buffer voltage Vc1 as a function of the power Pla consumed by the lamp in this embodiment, FIG. 4 diagrammatically shows a first modification of the first embodiment, FIG. 5 diagrammatically shows a second modification of the first embodiment.

FIG. 2 shows the circuit arrangement of FIG. 1 in greater detail. The first rectifying means RM1 are coupled to the input terminals T1, T2 via an input filter comprising inductive impedances L1, L2 and capacitive impedances C4, C5. The input terminals T1, T2 are interconnected by the capacitive impedance C4. A first side of the capacitive impedance C5 is connected to a first side of the capacitive impedance C4 via inductive impedance L1. A second side of the capacitive impedance C5 is connected to a second side of the capacitive impedance C4 via inductive impedance L2. Each of the sides of capacitive impedance C5 is connected to the first rectifying means RM1. The first rectifying means are shunted by a capacitive impedance C8.

The DC/AC converter has a first branch with a first and a second switching element S1, S2 which are switched alternately into a conducting state at a high frequency by the control means CR during operation. Control electrodes of the switching elements are for this purpose connected to outputs 1, 2 of the control means CR.

The series arrangement of load branch B comprises in that order the inductive means formed by inductive impedance L3, further inductive means formed by inductive impedance L4, the coupling means in the form of lamp connection terminals T3, T4, the second capacitive means formed by capacitive impedance C2, and a further capacitive impedance C7. A current supply conductor of a respective electrode of the lamp Li is connected to each of the lamp connection terminals T3, T4. The electrodes have additional current supply conductors which are not connected. In an alternative embodiment, the coupling means comprise additional lamp connection terminals T3', T4'. A further current supply conductor of a respective electrode is connected to each of these for the purpose of preheating or additional heating of the electrodes. The additional lamp connection terminals T3', T4' may be interconnected by a capacitive impedance. In yet another embodiment, the lamp connection terminals T3 and T3' are interconnected by a series arrangement of a capacitive impedance and a coil which is magnetically coupled to the inductive impedance L3. The lamp connection terminals T4 and T4' are interconnected in a similar manner in that case. A first end of the load branch formed by an end of inductive impedance L3 is connected to a junction point N1 of the DC/AC converter. The junction point N1 is formed by a common point in the first branch shared by the first and the second switching element S1, S2. A second end of the load branch formed by a side of capacitive impedance C7 is connected to a junction point N2 between the first rectifying means RM1 and the first capacitive means C1. A portion of the load branch formed by the further capacitive impedance C7, capacitive impedance C2, and lamp connection terminals T3, T4 with the lamp Li connected thereto is shunted by a capacitive impedance C6.

The second rectifying means RM2 are coupled here to the first capacitive means C1 in that they form a series circuit with the first rectifying means RM1 which shunt the first capacitive means. The second rectifying means RM2 comprise a feedback unit provided with a series arrangement of first and second unidirectional means which have the same orientation and which are formed by consecutive unidirectional elements D5 and D6. The feedback unit in addition comprises a feedback circuit through which a junction point N4 between the first and the second unidirectional means D5, D6 of the second rectifying means is coupled to junction point N3 in the load branch.

The second rectifying means RM2 are further coupled to a junction point N5 in the load branch. The second rectifying means RM2 for this purpose comprise a further feedback unit which is provided with a further series arrangement of first and second unidirectional means which have the same orientation and which are consecutively formed by the unidirectional elements D7 and D8. The further feedback unit is in addition provided with a further feedback circuit which connects the junction point N5 in the load branch to a junction point N6 between the first and the second unidirectional means of the further series arrangement. The coupling means T3, T4 are connected between the junction point N3 and the junction point N5 in the load branch. The further series arrangement shunts the series arrangement of unidirectional elements D5 and D6.

In the embodiment shown, the junction point N3 lies between the inductive means L3 and the further inductive means L4, and the feedback circuit comprises third capacitive means formed by a capacitive impedance C3.

The transfer function between the voltage at the junction point N3 and the voltage at the junction point N4, when the discharge lamp Li is absent, has a negative slope in gain frequency characteristic in the control range of the power consumed by the discharge lamp. The transfer function in the absence of the discharge lamp is a function of the values of the inductive impedances L3 and L4 and the capacitive impedance C6. The transfer function has a zero point whose frequency is determined by the inductive impedance L4 and the capacitive impedance C6. The amplification decreases in proportion as the frequency f rises and approaches the zero point.

The circuit arrangement shown in FIGS. 1 and 2 operates as follows. When the input terminals T1, T2 are connected to a low-frequency voltage source Vin, the low-frequency supply voltage delivered by the low-frequency supply voltage source is rectified by the first rectifying means D1–D4, so that a DC voltage arises across the first capacitive means C1. The switching elements S1, S2 are switched alternately into the conducting and non-conducting state by the means CR at a frequency f which is dependent on the control signal Sg. This leads to a high-frequency, substantially square-wave AC voltage at the junction point N1. This AC voltage causes an alternating current to flow through the inductive means L3. A first part of this current flows through the further inductive means L4, the lamp connection terminals T3, T4 and the lamp Li connected thereto, the second capacitive means C2, and the capacitive impedance C7 to junction point N2. A second part of the current flows through the capacitive impedance C6 to junction point N2, and a remaining part flows through the third capacitive means C3 to junction point N4. As a result of this, a high-frequency voltage having the same frequency as the substantially square-wave AC voltage at the first junction point N1 is present both at junction point N4 and at junction point N6. These voltages at the junction points N4 and N6 achieve that a current is derived from the supply voltage source also if the buffer voltage is higher than the instantaneous value of the rectified voltage of this source. The power factor of the circuit arrangement is comparatively high as a result of this, and the total harmonic distortion is comparatively low. When the lamp power is set for a lower value through the choice of a higher frequency f, the current through the feedback circuit from N3 to N4 decreases comparatively strongly, so that the buffer voltage remains limited to a sufficient degree.

A circuit arrangement as shown in FIGS. 1 and 2 was connected to a supply voltage source having a frequency of 50 Hz and an effective voltage of 220 V for operating a low-pressure mercury discharge lamp with a power rating of 50 W. The peak value of the voltage source was 311 V. In this embodiment, which is given by way of example, the capacitive impedances C1, C2, C3, C4, C5, C6, C7, C8, and C9 therein had capacitance values of 10 $\mu$F, 180 nF, 12 nF, 220 nF, 100 nF, 8.2 nF, 10 nF, and 180 nF, respectively. The inductive impedances L1, L2 were formed by windings of a common mode transformer and each had an inductance value of 22 mH. The inductive impedances L3 and L4 had respective inductance values of 360 $\mu$H and 540 $\mu$H. The unidirectional elements D1–D4 were diodes of the 1N4007 type, made by Philips. The unidirectional elements D5–D8 used were BYD37J type diodes, also made by Philips. FETs, type 830, made by International Rectifier, served as the switching elements S1, S2. The control means CR were constructed as an IC of SGS-Thomson, type SG 3524N.

Figure 3:
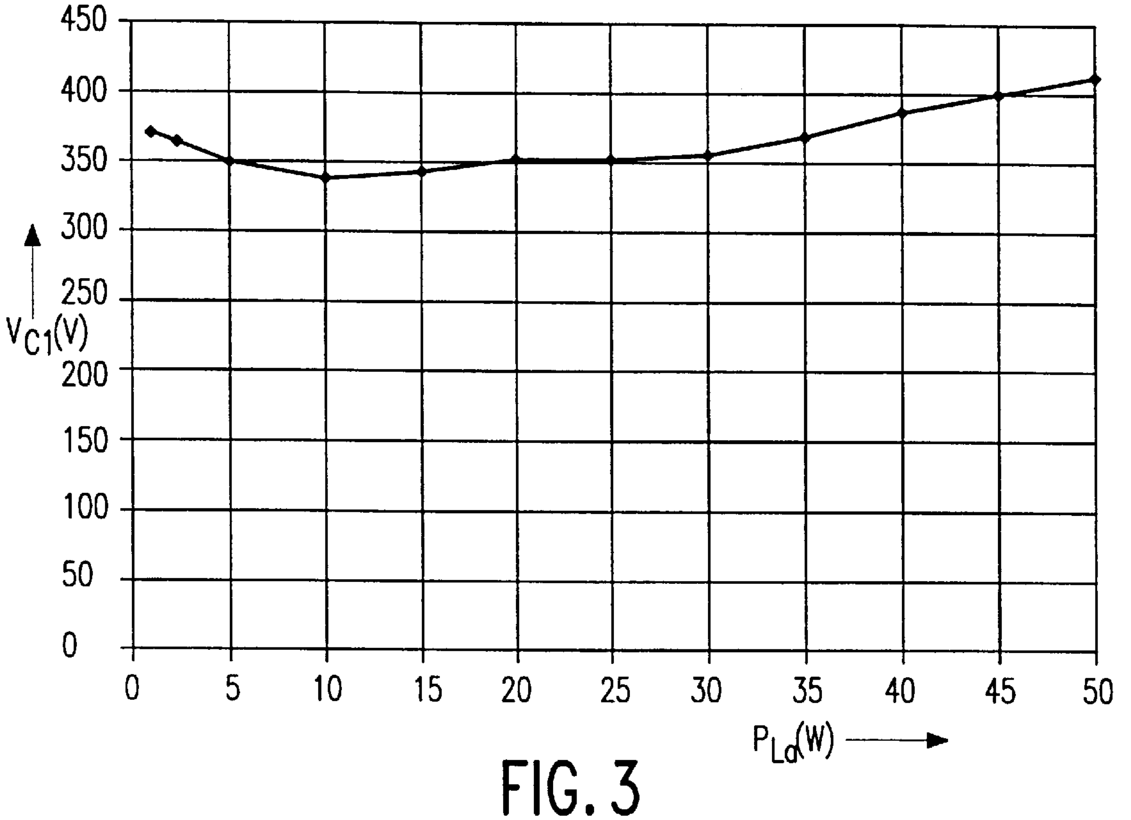

The lamp power was varied over a range from 2.5 to 50 W through variation of the frequency f between 75.5 kHz and 65 kHz. The buffer voltage Vc1 in volts as a function of the lamp power Pla in watts is plotted in FIG. 3. It is apparent therefrom that the buffer voltage Vc1 on the one hand is higher than the bottom value, here the peak value of the low-frequency supply voltage, i.e. 311 V, while on the other hand the variation in the voltage Vc1 is limited over a wide range of the lamp power setting. The voltage Vc1 in this case varies between 330 V and 420 V in said range.

Figure 4:
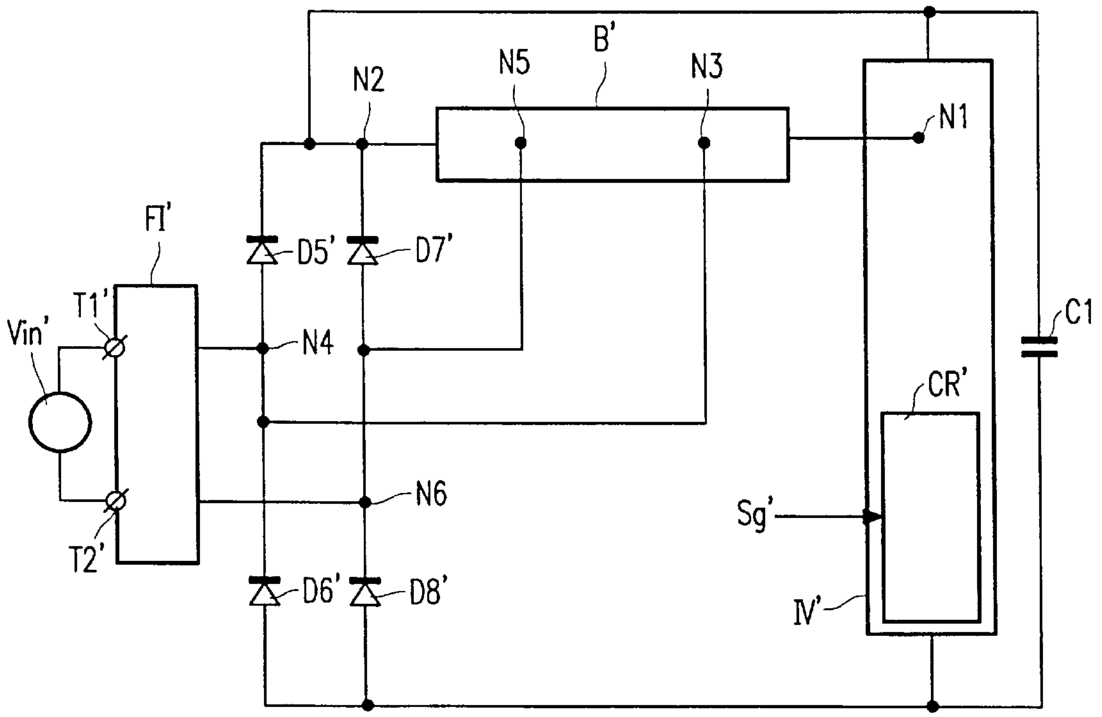

A first modification of the above embodiment is shown in FIG. 4. Components corresponding to those of FIGS. 1 and 2 have reference symbols to which an accent sign (') has been added. The unidirectional elements D5'–D8' in this modification at the same time serve as the first rectifying means. The undirectional elements D5'–D8' are constructed, for example, as type BYD37M diodes, made by Philips.

Figure 5:
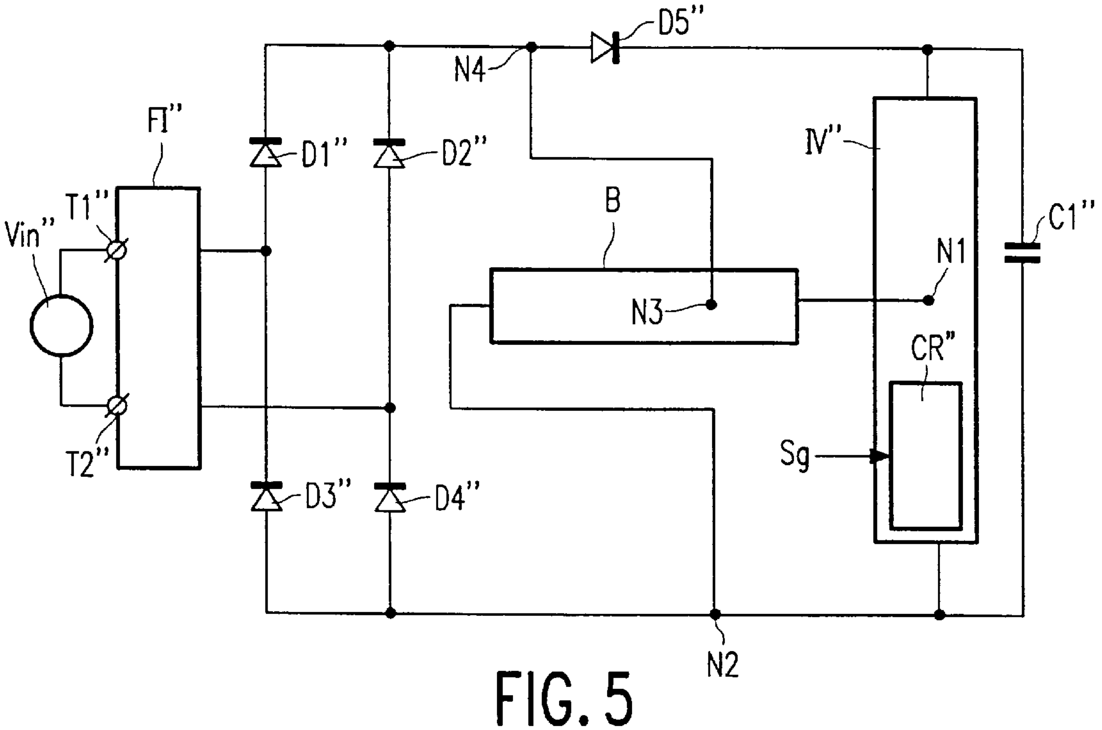

A second modification is shown in FIG. 5. Components therein which correspond to those of FIGS. 1 and 2 have reference symbols to which a double accent sign (") has been added. The second rectifying means in the second modification have a single feedback circuit N3–N4. Unidirectional elements D1"–D4" form first rectifying means. Unidirectional elements D1" and D2" together with D5" in addition form a rectifying branch which forms part of the second rectifying means.

Figure 6:
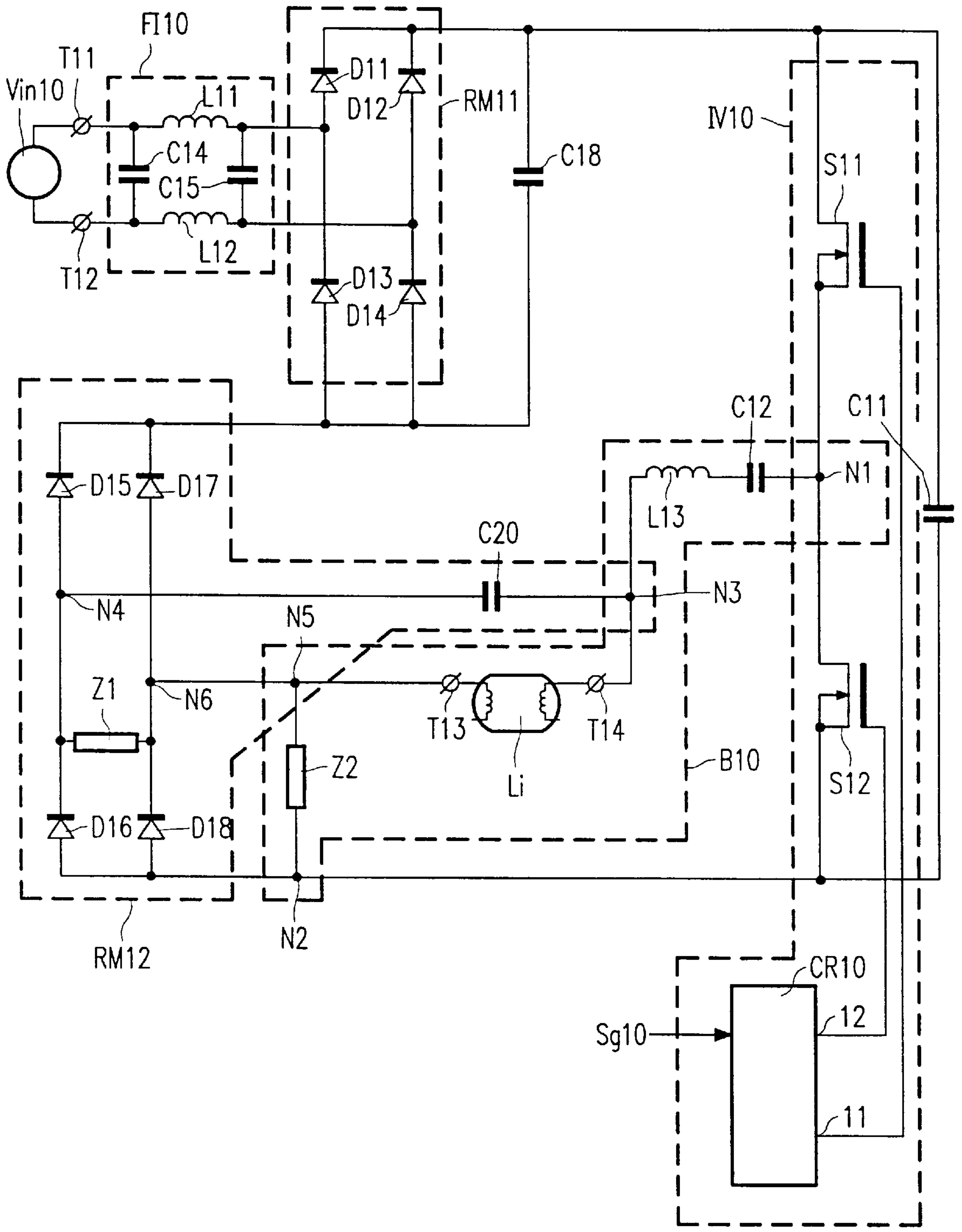
FIG. 6 shows a second embodiment of the circuit arrangement according to the invention, FIG. 7 plots the buffer voltage Vc11 as a function of the power Pla consumed by the lamp in the second embodiment, FIG. 8 plots the buffer voltage Vc11' as a function of the power Pla consumed by the lamp in a modification of the second embodiment, and FIG. 9 plots the power Pla consumed by the lamp as a function of the frequency of the DC/AC converter.

In the embodiment shown in FIG. 6, components corresponding to those of FIGS. 1 and 2 have reference numerals which are 10 higher. In this embodiment, the second rectifying means are provided with unidirectional means D16 which are shunted by a parallel branch. This parallel branch is here formed by the impedances Z1, Z2, impedance Z1 forming a connection between junction points N4 and N6, while Z2 at the same time forms a part of the load branch. In an embodiment, the first impedance Z1 is a series arrangement of capacitive means and inductive means, and the second impedance Z2 is formed by capacitive means. In a practical embodiment, the circuit arrangement serves as a supply unit for a low-pressure discharge lamp having a power rating of 50 W. The capacitive impedances C11, C12, and C20 therein have respective values of 10 μF, 180 nF, and 8.2 nF. The inductive impedance L13 has an inductance value of 930 μH. The capacitive means and the inductive means of the impedance Z1 have a capacitance value of 12 nF and an inductance value of 220 μH, respectively. The capacitive means of the impedance Z2 have a capacitance value of 8.2 nF.

Figure 7:
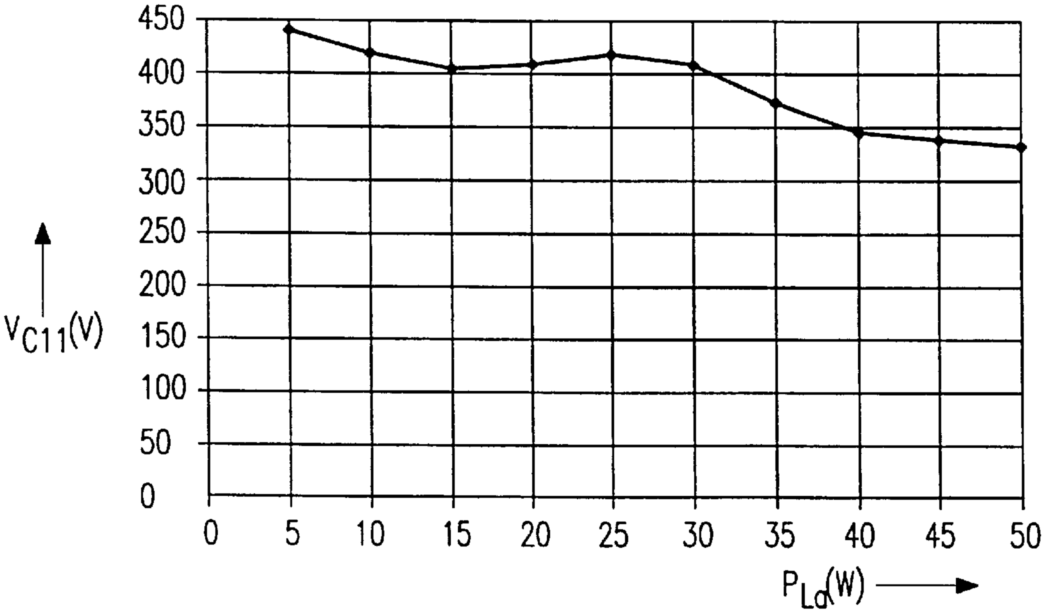

The power consumed by the lamp varied from 50 W to 5 W when the frequency was varied from 48 to 80 kHz. FIG. 7 shows that the buffer voltage does rise gradually during this frequency variation, but remains limited to values lower than 450 V. The lowest voltage, 330 V, is higher than the bottom value, i.e. the peak value of the supply voltage source of 311 V in this case.

Figure 8:
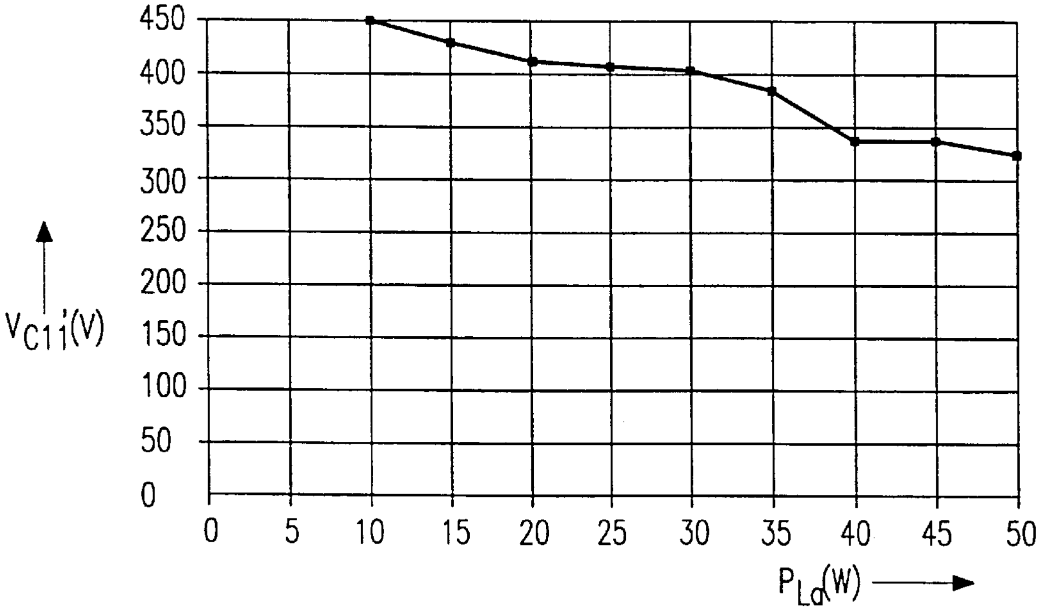

Favorable results were also obtained with a modification of the embodiment of FIG. 6 in which the second impedance Z2 is also a branch comprising inductive means and capacitive means. In this modification, the capacitive means and the inductive means of impedance Z1 have a capacitance value of 7.4 nF and an inductance value of 220 μH, respectively. The capacitive means and the inductive means of impedance Z2 have a capacitive value of 18 nF and an inductance value of 68 μH, respectively. As FIG. 8 shows, the voltage Vc11' across the first capacitive means C1 rises monotonically from a first voltage Vmin, which is 320 V, at a nominal power of 50 W consumed by the lamp, to a second voltage Vmax, which is 450 V, at a lamp power which is one-fifth the nominal lamp power. The ratio Vmax/Vmin is 1.4 and accordingly lies between 1.2 and 1.7.

Figure 9:
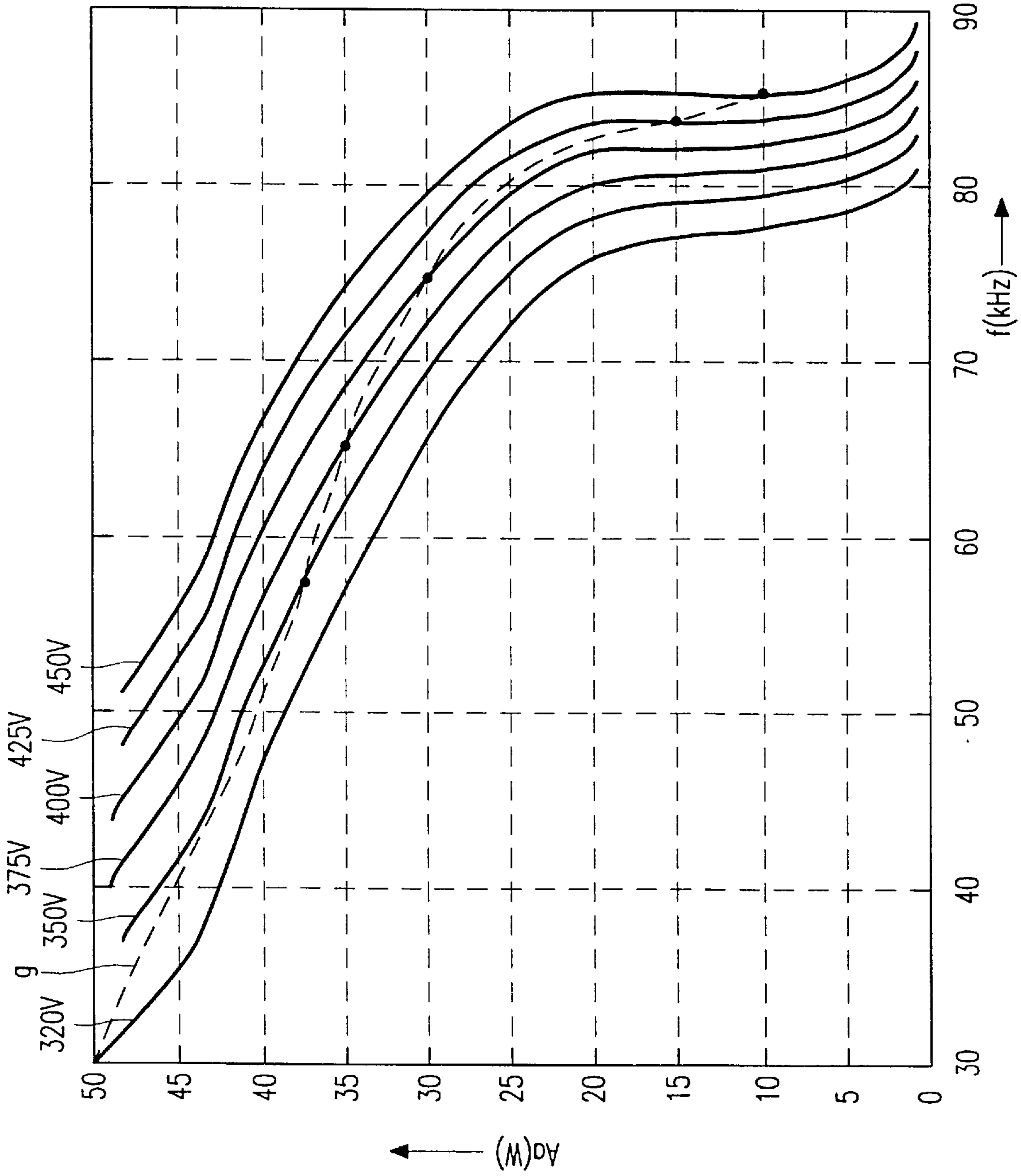

The full-line curves of FIG. 9 show the power Pla consumed by the lamp in watts as a function of the frequency f for constant buffer voltages of 320, 350, 375, 400, 425, and 450 V, respectively, in a circuit arrangement not according to the invention. The broken-line curve, referenced g, represents the power Pla consumed by the lamp in W as a function of the frequency f for the modification of the circuit arrangement according to the invention described above. The power Pla varies very strongly with the frequency in a range from approximately 5 to 20 W in the circuit arrangement not according to the invention. Since the buffer voltage Vc11 rises gradually with a decreasing lamp power in the circuit arrangement according to the invention, the setpoint (Pla, f) is also shifted. The resulting curve g thus has a more gradual gradient in said range, so that a stable setting of the circuit arrangement with the lamp connected thereto can be realized more easily.

We claim:

1. A circuit arrangement for high-frequency operation of a discharge lamp, comprising:

input terminals for connection to a low-frequency supply voltage source, first rectifying means for generating a DC voltage across first capacitive means from a low-frequency supply voltage delivered by the low-frequency supply voltage source, a DC/AC converter for generating a high-frequency AC voltage with a frequency f from the DC voltage, a load branch including a series circuit of inductive means, second capacitive means, and coupling means for coupling the discharge lamp to the load branch, which series circuit connects a junction point N1 of the DC/AC converter to a junction point N2 between the first rectifying means and the first capacitive means, second rectifying means for converting a high-frequency voltage generated by means of the DC/AC converter into a further DC voltage, which second rectifying means are coupled to the first capacitive means and to a junction point N3 in the load branch, control means for controlling a power consumed by the discharge lamp during steady state lamp operation and in dependence on a control signal which is a measure of the desired power, characterized in that the control means change the frequency f when the control signal changes, and in that the coupling means are connected in the load branch between the junction point N2 and the junction point N3.

2. A circuit arrangement as claimed in claim 1, characterized in that the voltage across the first capacitive means rises monotonically from a first voltage Vmin at a nominal power consumed by the lamp to a second voltage Vmax at a lamp power one-fifth of the nominal lamp power, the ratio Vmax/Vmin lying between about 1.2 and 1.7.

3. A circuit arrangement as claimed in claim 1, characterized in that the transfer function between the voltage at the junction point N3 and the voltage at the junction point N1 in the absence of the discharge lamp has a negative amplification-frequency characteristic in the control range of the power consumed by the discharge lamp.

4. A circuit arrangement as claimed in claim 3, characterized in that the load branch comprises further inductive means, and the junction point N3 lies between the inductive means and the further inductive means, and the second rectifying means are coupled to the junction point N3 in the load branch via a feedback circuit provided with third capacitive means.

5. A circuit arrangement as claimed in claim 1, characterized in that the second rectifying means are provided with unidirectional means which are shunted by a parallel branch.

6. A circuit arrangement as claimed in claim 1, characterized in that the second rectifying means are additionally connected to a junction point N5 in the load branch, and the coupling means are connected between the junction point N3 and the junction point N5 in the load branch.

7. A circuit arrangement as claimed in claim 1 wherein the junction point N2 is further coupled via a third capacitive means to a node in the series circuit between the coupling means and the junction point N1.

8. A circuit arrangement as claimed in claim 1 wherein the second rectifying means is coupled to the junction point N3 via third capacitive means and is further coupled to a further junction point in the load branch via fourth capacitive means.

9. A circuit arrangement as claimed in claim 1 further comprising impedance means connected in series with the coupling means between the junction points N2 and N3.

10. A circuit arrangement as claimed in claim 9 wherein the impedance means comprises said second capacitive means and a further inductive means.

11. A circuit arrangement as claimed in claim 1 wherein the second rectifying means are coupled to the junction point N3 in the load branch via a feedback circuit including third capacitive means such that the voltage at the junction point N3 is relatively independent of lamp current.

12. A circuit arrangement as claimed in claim 1 further comprising a further capacitive means coupled in shunt with the series connection of the second capacitive means and the coupling means.

13. A circuit arrangement as claimed in claim 1 wherein the first and second rectifying means comprise a single diode bridge circuit having a first pair of terminals coupled to the supply voltage input terminals and a second pair of terminals coupled across the first capacitive means.

14. A circuit arrangement as claimed in claim 1 wherein the first rectifying means comprise a diode bridge circuit having first and second terminals coupled to the supply voltage terminals, a third terminal coupled to a first terminal of the first capacitive means, and a fourth terminal coupled via a diode to a second terminal of the first capacitive means, wherein the junction point N3 is coupled to a further junction point between said fourth terminal of the diode bridge circuit and a terminal of the diode, and wherein said diode and at least one diode of the diode bridge circuit form a part of the second rectifying means.

15. A circuit arrangement as claimed in claim 1 wherein the second rectifying means comprises first and second series connected diodes with a junction point therebetween coupled via a first impedance means to a further junction point in the load circuit, and the circuit arrangement further comprises a second impedance means coupled between said further junction point in the load circuit and the junction point N2.

* * * * *